(12) United States Patent
Comport et al.

(10) Patent No.: US 9,940,725 B2
(45) Date of Patent: Apr. 10, 2018

(54) METHOD FOR ESTIMATING THE SPEED OF MOVEMENT OF A CAMERA

(71) Applicant: PIXMAP, Valbonne (FR)

(72) Inventors: Andrew Comport, Biot (FR); Maxime Meilland, Biot (FR)

(73) Assignee: PIXMAP, Valbonne (FR)

( * ) Notice: Subject to any disclaimer, the term of this patent is extended or adjusted under 35 U.S.C. 154(b) by 133 days.

(21) Appl. No.: 15/037,597

(22) PCT Filed: Nov. 17, 2014

(86) PCT No.: PCT/EP2014/074762
§ 371 (c)(1),
(2) Date: May 18, 2016

(87) PCT Pub. No.: WO2015/071457
PCT Pub. Date: May 21, 2015

(65) Prior Publication Data
US 2016/0292882 A1   Oct. 6, 2016

(30) Foreign Application Priority Data
Nov. 18, 2013   (FR) ...................................... 13 61305

(51) Int. Cl.
*G06T 7/20* (2017.01)
*G06T 7/70* (2017.01)
*G06T 7/246* (2017.01)

(52) U.S. Cl.
CPC .............. *G06T 7/204* (2013.01); *G06T 7/248* (2017.01); *G06T 7/70* (2017.01); *G06T 2207/30244* (2013.01)

(58) Field of Classification Search
CPC ........... G06T 7/204; G06T 7/74; G06T 7/248; G06T 2207/30244; G06T 2207/30241; H05N 5/247
See application file for complete search history.

(56) References Cited

U.S. PATENT DOCUMENTS

| 2008/0030587 A1 | 2/2008 | Helbing |
| 2009/0201383 A1 | 8/2009 | Slavin |

(Continued)

FOREIGN PATENT DOCUMENTS

| JP | 2007-143118 | 6/2007 |
| JP | 2011-103631 | 5/2011 |
| WO | WO2008/128205 | 10/2008 |

OTHER PUBLICATIONS

Maxime Meilland et al. "A Unified Rolling Shutter and Motion Blur Model for 3D Visual Registration, OpenAccess Version", 2013 IEEE International Conference on Computer Vision, pp. 2016-2023, Nov. 2013—XP055129443.

(Continued)

*Primary Examiner* — Huy T Nguyen
(74) *Attorney, Agent, or Firm* — Robert C. Kowert; Meyertons, Hood, Kivlin, Kowert & Goetzel, P.C.

(57) ABSTRACT

A method for estimating the speed a first video camera when it captures a current image of a three-dimensional scene, the current image including pixels. The method includes storing a reference image corresponding to an image of the same scene captured by a second video camera in a different pose, the reference image including pixels. The method also includes storing the current image, containing for each pixel of the current image the measurement of a physical magnitude measured by that pixel, which is the same as the physical magnitude measured by the pixels of the reference image. The method further includes storing for each pixel of the reference image or of the current image the measurement of a depth that separates that pixel from the point of the scene photographed by that pixel, estimating the pose and speed of the first video camera.

21 Claims, 2 Drawing Sheets

(56) References Cited

U.S. PATENT DOCUMENTS

| | | |
|---|---|---|
| 2009/0207259 A1 | 8/2009 | Ito et al. |
| 2009/0316009 A1 | 12/2009 | Ito et al. |
| 2012/0196679 A1 | 8/2012 | Newcombe et al. |
| 2012/0287295 A1 | 11/2012 | Oota |
| 2013/0070121 A1 | 3/2013 | Gu et al. |
| 2013/0194418 A1 | 8/2013 | Gonzalez-Banos et al. |
| 2013/0244782 A1 | 9/2013 | Newcombe et al. |

OTHER PUBLICATIONS

Meilland et al., "On Unifying Key-Frame and Voxel-Based Dense Visual SLAM at Large Scales" CNRS-13S—pp. 1-7.

METHOD FOR ESTIMATING THE SPEED OF MOVEMENT OF A CAMERA

RELATED APPLICATIONS

This application is the national stage, under 35 USC 371, of PCT application PCT/EP2014/074762, filed on Nov. 17, 2014, which claims the benefit of the Nov. 18, 2013 priority date of French application 1361305, the content of which is herein incorporated by reference.

FIELD OF INVENTION

The invention concerns a method and a system for estimating the speed of movement of a video camera at the moment when that video camera is capturing a current image of a three-dimensional scene. The invention also concerns a method for constructing the trajectory of a rolling shutter video camera and a method for processing an image using the method for estimating the speed of movement. The invention further consists in an information storage medium for implementing those methods.

BACKGROUND

It is well known that moving a video camera while it is capturing an image distorts the captured image. For example, "motion blur" appears. This is caused by the fact that to measure the luminous intensity of a point of a scene each pixel must continue to be exposed to the light emitted by that point for an exposure time $t_e$. If the video camera is moved during this time $t_e$, the pixel is not exposed to light from a single point but to that emitted by a plurality of points. The luminous intensity measured by this pixel is then that from a plurality of points of light, which causes motion blur to appear.

Nowadays, there also exist increasing numbers of rolling shutter video cameras. In those video cameras, the rows of pixels are captured one after the other, so that, in the same image, the moment of capturing one row of pixels is offset temporally by a time $t_A$ from the moment of capturing the next row of pixels. If the video camera moves during the time $t_A$, that creates distortion of the captured image even if the exposure time $t_e$ is considered negligible.

To correct such distortion, it is necessary to estimate correctly the speed of the video camera at the moment at which it captures the image.

To this end, methods known to the inventors for estimating the speed of movement of a first video camera at the moment when that first video camera is capturing a current image of a three-dimensional scene have been developed. These known methods are called feature-based methods. These feature-based methods include steps of extracting particular points in each image known as features. The features extracted from the reference image and the current image must then be matched. These steps of extracting and matching features are badly conditioned, affected by noise and not robust. They are therefore complex to implement.

The speed of movement of the first video camera is estimated afterwards on the basis of the speed of movement of these features from one image to another. However, it is desirable to simplify the known methods.

SUMMARY

To this end, the invention consists in a first method in accordance with claim 1 for estimating the speed of movement of a first video camera at the moment at which that first video camera is capturing a current image of a three-dimensional scene.

The invention also consists in a second method in accordance with claim 4 for estimating the speed of movement of a first video camera at the moment at which that first video camera is capturing a current image of a three-dimensional scene.

The above methods do not use any step of extracting features in the images or of matching those features between successive images. To this end, the above methods directly minimize a difference between measured physical magnitudes in the reference image and in the current image for a large number of pixels of those images. This simplifies the method.

Moreover, given that the difference between the physical magnitudes is calculated for a very large number of points of the images, i.e. for more than 10% of the pixels of the current or reference image, the number of differences to be minimized is much greater than the number of unknowns to be estimated. In particular, the number of differences taken into account to estimate the speed is much greater than in the case of feature-based methods. There is therefore a higher level of information redundancy, which makes the above method more robust than the feature-based methods.

It will also be noted that in the above methods only one of the images has to associate a depth with each pixel. The first or second video camera can therefore be a simple monocular video camera incapable of measuring the depth that separates it from the photographed scene.

Finally, the above methods make it possible to estimate the speed accurately even in the presence of distortion in the current image caused by the rolling shutter effect. To this end, in the above methods, the coordinates of one of the first and second points are determined taking account of the movements of the first video camera during the time $t_A$. The first and second values of the physical magnitude therefore both correspond more precisely to the same photographed point of the scene, which improves the estimate of the speed.

The embodiments of these methods may include one or more of the features of the dependent claims.

These embodiments of the methods for estimating the speed moreover have the following advantages:

averaging values of the physical magnitude at the level of a plurality of adjacent pixels and the reference point to construct a value of the physical magnitude corresponding to that which would be obtained if the second video camera moved at the same speed as the first video camera and had the same exposure time makes it possible to increase the accuracy of the estimate of the speed since account is then taken both of the distortions caused by the rolling shutter effect and the motion blur;

carrying out the steps d) and e) simultaneously makes it possible to estimate simultaneously the pose and the speed of the first video camera and therefore to reconstruct its trajectory in the photographed scene without recourse to additional sensors such as an inertial sensor;

estimating the pose from the speed $x_{vR}$ and the time $t_p$ elapsed between capturing two successive current images makes it possible to limit the number of unknowns to be estimated, which simplifies and accelerates the estimation of this speed $x_{vR}$;

taking the speed of movement in translation and in rotation as unknowns makes it possible to estimate simultaneously the speed in translation and in rotation of the first video camera.

The invention further consists in a method in accordance with claim 11 for constructing the trajectory of a first rolling shutter video camera in a three-dimensional scene.

The invention further consists in a method in accordance with claim 12 for processing a current image of a three-dimensional scene.

The invention further consists in an information storage medium containing instructions for executing one of the above methods when those instructions are executed by an electronic computer.

The invention further consists in a first system in accordance with claim 14 for estimating the speed of movement of a first video camera at the moment at which that first video camera is capturing a current image of a three-dimensional scene.

Finally, the invention further consists in a second system in accordance with claim 15 for estimating the speed of movement of a first video camera at the moment at which that first video camera is capturing a current image of a three-dimensional scene.

The invention will be better understood on reading the following description, which is given by way of nonlimiting example only and with reference to the drawings

BRIEF DESCRIPTION OF THE DRAWINGS

In these figures, the same references are used to designate the same elements.

DETAILED DESCRIPTION

In the remainder of this description, features and functions well known to a person skilled in the art are not described in detail. For a description of the technological background and the notation and concepts used in this description, the reader may refer to the following book L1: Yi M A, S. SOATTO, J. KOSECKA, S. SHANKAR SASTRY, "*An invitation to 3-D vision. From images to Geometric Models*", Springer, 2004

Figure 1:
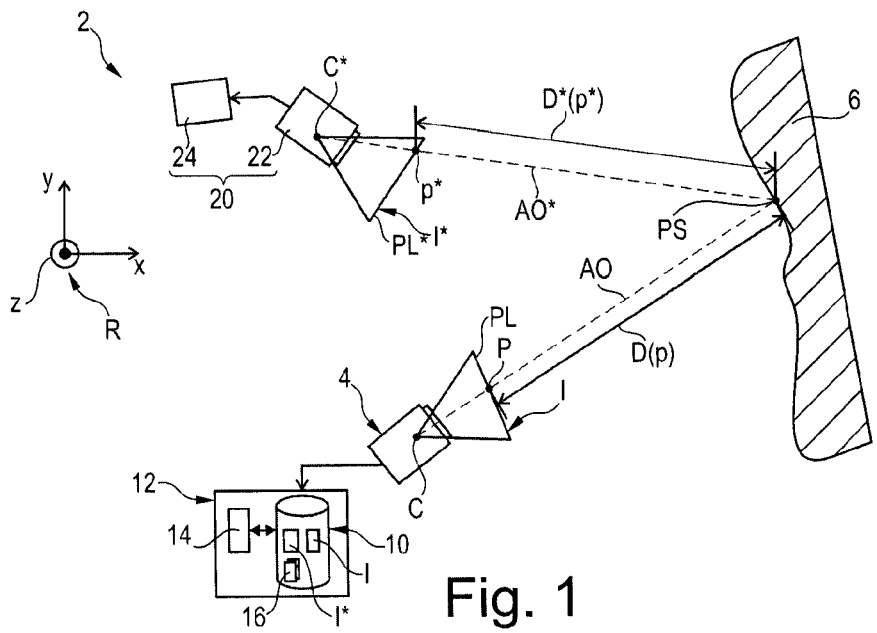
FIG. 1 is a diagrammatic illustration of a system for estimating the speed of movement of a video camera at the moment at which the latter is capturing an image and for processing and correcting the images so captured.

FIG. 1 represents an image processing system 2 for estimating the pose $x_{pR}$ and the speed $x_{vR}$ of a video camera at the moment at which the latter is acquiring a current image. This system is also adapted to use the estimated pose $x_{pR}$ and speed $x_{vR}$ to construct the trajectory of the video camera and/or to process the current images in order to correct them.

This system 2 includes a video camera 4 that captures a temporally ordered series of images of a three-dimensional scene 6. The video camera 4 is mobile, i.e. it is movable within the scene 6 along a trajectory that is not known in advance. For example, the video camera 4 is transported and moved by hand by a user or fixed to a robot or a remote-controlled vehicle that moves inside the scene 6. Here the video camera 4 is freely movable in the scene 6 so that its pose $x_{pR}$, i.e. its position and its orientation, is a vector in six unknowns.

The scene 6 is a three-dimensional space. It may be a space situated inside a building such as an office, a kitchen or corridors. It may equally be an exterior space such as a road, a town or a terrain.

The video camera 4 records the ordered series of captured images in an electronic memory 10 of an image processing unit 12. Each image includes pixels organized into parallel rows. Here, these pixels are organized in columns and rows. Each pixel corresponds to an individual sensor that measures a physical magnitude. Here the measured physical magnitude is chosen from radiation emitted by a point of the scene 6 and the distance separating this pixel from this point of the scene 6. This distance is referred to as the "depth". In this first embodiment, the pixels of the video camera 4 measure only the intensity of the light emitted by the photographed point of the scene. Here each pixel measures in particular the color of the point of the scene photographed by this pixel. This color is coded using the RGB (Red-Green-Blue) model, for example.

Here the video camera 4 is a rolling shutter video camera. In such a video camera the rows of pixels are captured one after the other, in contrast to what happens in a global shutter video camera.

Figure 2A:
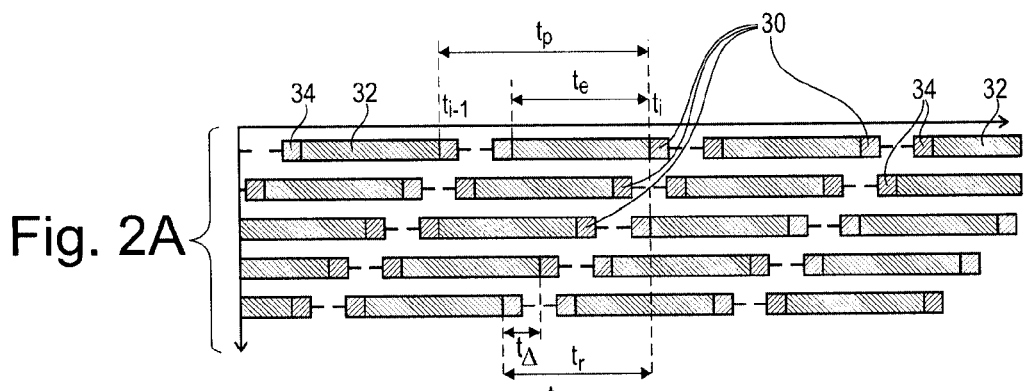
FIGS. 2A and 2B are timing diagrams showing the moments of acquisition of different rows of pixels, firstly in the case of a rolling shutter video camera and secondly in the case of a global shutter video camera.
Figure 2B:
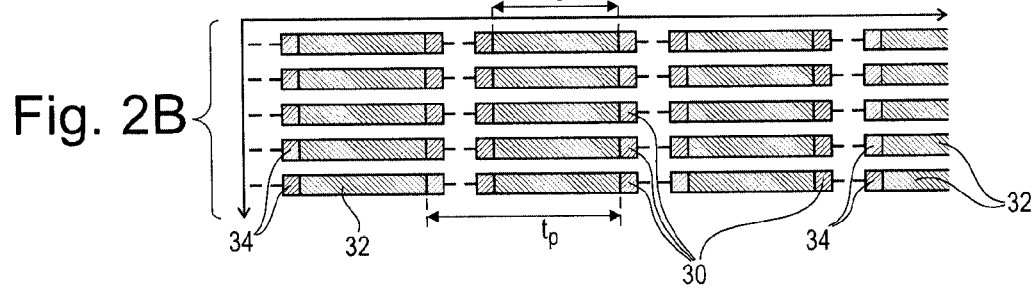

FIGS. 2A and 2B show more precisely the features of the video camera 4 compared to those of a global shutter video camera. In the graphs of FIGS. 2A and 2B the horizontal axis represents time and the vertical axis represents the number of the row of pixels. In these graphs each row of pixels, and therefore each image, is captured with a period $t_p$. The time necessary for capturing the luminous intensity measured by each pixel of the same row is represented by a shaded block 30. Each block 30 is preceded by a time $t_e$ of exposure of the pixels to the light rays to be measured. This time $t_e$ is represented by rectangles 32. Each exposure time $t_e$ is itself preceded by a time for reinitialization of the pixels represented by blocks 34.

In FIG. 2A, the pixels are captured by the video camera 4 and in FIG. 2B the pixels are captured by a global shutter video camera. Accordingly, in FIG. 2A the blocks 30 are offset temporally relative to one another because the various rows of the same image are captured one after the other and not simultaneously as in FIG. 2B.

The time $t_A$ that elapses between the moments of capturing two successive rows of pixels is non-zero in FIG. 2A. Here it is assumed that the time $t_A$ is the same whichever pair of successive rows may be selected in the image captured by the video camera 4.

Moreover, it is assumed hereinafter that the time $t_A$ is constant over time. Because of the existence of this time $t_A$, a complete image can be captured by the video camera 4 only in a time $t_r$ equal to the sum of the times $t_A$ that separate the moments of capture of the various rows of the complete image.

As indicated above, it is well known that if the video camera 4 moves between the moments of capturing one row and the next, this introduces distortion into the captured image. This distortion is referred to hereinafter as "RS distortion".

Moreover, it is also well known that if the video camera 4 moves during the exposure time $t_e$, this causes the appearance of motion blur in the image. This distortion is referred to hereinafter as "MB distortion".

In the remainder of this description it is assumed that the images captured by the video camera 4 are simultaneously affected by these two types of distortion, i.e. by RS distortion and MB distortion. The following methods therefore take account simultaneously of these two types of distortion.

Conventionally, each video camera is modeled by a model making it possible to determine from the coordinates of a point of the scene the coordinates of the point in the image plane that has photographed that point. The plane of an image is typically the plane of the space situated between a projection center C and the photographed scene onto which a central projection, with center C, of the scene makes it possible to obtain an image identical to that photographed by the video camera. For example, the pinhole model is used. More information on this model can be found in the following papers:

FAUGERAS, O. (1993). *Three-dimensional computer vision: a geometric viewpoint*. MIT Press Cambridge, Mss. 23

HARTLEY, R. I. & ZISSERMAN, A. (2004). *Multiple View Geometry in Computer Vision*. Cambridge University Press, 2nd edn. 23, 86

In these models, the position of each pixel is identified by the coordinates of a point p in the image plane. Hereinafter, to simplify the description, this point p is considered to be located at the intersection of an axis AO passing through the point PS of the scene photographed by this pixel (FIG. 1) and a projection center C. The projection center C is located at the intersection of all the optical axes of all the pixels of the image. The position of the center C relative to the plane of the image in a three-dimensional frame of reference F tied with no degree of freedom to the video camera 4 is an intrinsic feature of the video camera 4. This position depends on the focal length of the video camera, for example. All the intrinsic parameters of the video camera 4 that make it possible to locate the point p corresponding to the projection of the point PS onto the plane PL along the axis OA are typically grouped together in a matrix known as the matrix of the intrinsic parameters of the video camera or the "intrinsic matrix". This matrix is denoted K. It is typically written in the following form:

$$K = \begin{bmatrix} f & s & u_0 \\ 0 & f \times r & v_0 \\ 0 & 0 & 1 \end{bmatrix}$$

where:
f is the focal length of the video camera expressed in pixels,
s is the shear factor,
r is the dimensions ratio of a pixel, and the pair $(u_0, v_0)$ corresponds to the position expressed in pixels of the principal point, i.e. typically the center of the image.

For a video camera of good quality the shear factor is generally zero and the dimensions ratio close to 1. This matrix K is notably used to determine the coordinates of the point p corresponding to the projection of the point PS onto the plane PL of the video camera. For example, the matrix K may be obtained during a calibration phase. For example, such a calibration phase is described in the following papers:

TSAI, R. Y. (1992). Radiometry. chap. *A versatile camera calibration technique for high-accuracy 3D machine vision metrology using off-the-shelf TV cameras and lenses*, 221-244. 23

HEIKKILÄ, J. & SILVEN, O. (1997). *A four-step camera calibration procedure with implicit image correction*. In IEEE International Conference on Computer Vision and Pattern Recognition, 1106-. 23, 24

ZHANG, Z. (1999). *Flexible camera calibration by viewing a plane from unknown orientations*. In International Conference on Computer Vision, 666-673. 23, 24.

It is equally possible to obtain this matrix K from an image of an object or from a calibration pattern the dimensions of which are known, such as a checkerboard or circles.

For a fixed focal length lens, this matrix is constant over time. To facilitate the following description, it will therefore be assumed that this matrix K is constant and known.

In this description, the pose of the video camera 4 is denoted $x_{pR}$, i.e. its position and its orientation in a frame of reference R tied with no degree of freedom to the scene 6. Here the frame of reference R includes two mutually orthogonal horizontal axes X and Y and vertical axis Z. The pose $x_{pR}$ is therefore a vector with six coordinates of which three are for representing its position in the frame of reference R plus three other coordinates for representing the inclination of the video camera 4 relative to the axes X, Y and Z. For example, the position of the video camera 4 is identified in the frame of reference R by the coordinates of its projection center. Similarly, by way of illustration, the axis used to identify the inclination of the video camera 4 relative to the axes in the frame of reference R is the optical axis of the video camera 4.

Hereinafter, it is assumed that the video camera 4 is capable of moving with six degrees of freedom, so that the six coordinates of the pose of the video camera 4 are unknowns that must be estimated.

Also $x_{vR}$ denotes the speed of the video camera 4, i.e. its speed in translation and in rotation expressed in the frame of reference R. The speed $x_{vR}$ is a vector with six coordinates, three of which coordinates correspond to the speed of the video camera 4 in translation along the axes X, Y and Z, and of which three other coordinates correspond to the angular speeds of the video camera 4 about its axes X, Y and Z.

For each image captured by the video camera 4 and for each pixel of that image, the following information is stored in the memory 10:
the coordinates in the plane of the image of a point p identifying the position of the pixel in the plane PL of the image,
a measurement of the luminous intensity I(p) measured by this pixel.

Here the function I( . . . ) is a function that associates with each point of the plane PL of the image the measured or interpolated intensity at the level of that point.

The processing unit 12 is a unit capable of processing the images captured by the video camera 4 to estimate the pose $x_{pR}$ and the speed $x_{vR}$ of that video camera at the moment at which it captures an image. Moreover the unit 12 is also capable here of:

constructing the trajectory of the video camera 4 in the frame of reference R on the basis of the successive estimated poses $x_{pR}$, and correcting the images captured by the video camera 4 to eliminate or limit the RS or MB distortions.

To this end, the unit 12 includes a programmable electronic calculator 14 capable of executing instructions stored in the memory 12. The memory 12 notably contains the instructions necessary for executing any one of the methods from FIGS. 4, 6 and 7.

The system 2 also includes a device 20 used to construct a three-dimensional model 16 of the scene 6. The model 16 makes it possible to construct reference augmented images. Here "augmented image" designates an image including, for each pixel, in addition to the intensity measured by that pixel, a measurement of the depth that separates that pixel from the point of the scene that it photographs. The measurement of the depth therefore makes it possible to obtain the coordinates of the scene photographed by that pixel. Those coordinates are expressed in the three-dimensional frame of reference tied with no degree of freedom to the video camera that has captured this augmented image. Those coordinates typically take the form of a triplet (x, y, D(p)), where:

x and y are the coordinates of the pixel in the plane PL of the image, and

D(p) is the measured depth that separates this pixel from the point PS of the scene that it has photographed.

The function D associates with each point p of the augmented image the measured or interpolated depth D(p).

Here the device 20 includes an RGB-D video camera 22 and a processing unit 24 capable of estimating the pose of the video camera 22 in the frame of reference R. The video camera 22 is a video camera that measures both the luminous intensity I*(p*) of each point of the scene and the depth D*(p*) that separates that pixel from the photographed point of the scene. The video camera 22 is preferably a global shutter video camera. Such video cameras are sold by the company Microsoft®, such as the Kinect® video camera, for example, or by the company ASUS®.

Hereinafter, the coordinates of the point PS are called vertices and denoted "v*" when they are expressed in the frame of reference F* tied with no degree of freedom to the video camera 22 and "v" when they are expressed in the frame of reference F. In a similar way, all the data relating to the video camera 22 is followed by the symbol "*" to differentiate it from the same data relating to the video camera 4.

For example, the unit 24 is equipped with a programmable electronic calculator and a memory containing the instructions necessary for executing a simultaneous localization and mapping (SLAM) process. For more details of these simultaneous localization and mapping processes, the reader may refer to the introduction to the following paper A1: M. Meilland and A. I. Comport, "*On unifying key-frame and voxel-based dense visual SLAM at large scales*" IEEE International Conference on Intelligence Robots and Systems, 2013, 3-8 Nov., Tokyo.

For example, the unit 24 is in the video camera 22.

The model 16 is constructed by the device 20 and stored in the memory 10. In this embodiment, the model 16 is a database in which the various reference images I* are stored. Moreover, in this database, the pose $x_{pR}$* of the video camera 22 at the moment at which the latter captured the image I* is associated with each of those images I*. Such a three-dimensional model of the scene 6 is known as a key-frame model. More information about such a model can be found in the paper A1 cited above.

The operation of the system 2 will now be described with reference to the FIG. 4 method.

The method begins with a learning phase 50 in which the model 16 is constructed and then stored in the memory 10. To this end, during a step 52, for example, the video camera 22 is moved within the scene 6 to capture numerous reference images I* based on numerous different poses. During this step, the video camera 22 is moved slowly so that there is negligible motion blur in the reference images. Moreover, such a slow movement also eliminates the distortions caused by the rolling shutter effect.

In parallel with this, during a step 54, the unit 24 estimates the successive poses of the video camera 22 for each captured reference image I*. It will be noted that this step 54 may also be carried out after the step 52, i.e. once all the reference images have been captured.

Then, in a step 56, the model 16 is constructed and then stored in the memory 10. To this end, a plurality of reference images and the pose of the video camera 22 at the moment at which those reference images were captured are stored in a database.

Once the learning phase has ended, a utilization phase 60 may then follow.

During this phase 60, and to be more precise during a step 62, the video camera 4 is moved along an unknown trajectory within the scene 6. As the video camera 4 is moved, it captures a temporal succession of images based on different unknown poses. Each captured image is stored in the memory 10. During the step 62 the video camera 4 is moved at a high speed, i.e. a speed sufficient for RS and MB distortions to be perceptible in the captured images.

In parallel with this, during a step 64, the unit 12 processes each image acquired by the video camera 4 in real time to estimate the pose $x_{pR}$ and the speed $x_{vR}$ of the video camera 4 at the moment at which that image was captured.

Here 'in real time' refers to the fact that the estimation of the pose $x_{pR}$ and the speed $x_{vR}$ of the video camera 4 is effected as soon as an image is captured by the video camera 4 and terminates before the next image is captured by the same video camera 4. Thereafter, the image captured by the video camera 4 used to determine the pose of that video camera at the moment of the capture of that image is referred to as the "current image".

For each current image acquired by the video camera 4, the following operations are reiterated. During an operation 66, the unit 12 selects or constructs a reference image I* that has photographed a large number of points of the scene 6 common with those that have been photographed by the current image. For example, to this end, a rough estimate is obtained of the pose $x_{pR}$ of the video camera 4 after which there is selected in the model 16 the reference image whose pose is closest to this rough estimate of the pose $x_{pR}$. The rough estimate is typically obtained by interpolation based on the latest poses and speeds estimated for the video camera 4. For example, in a simplified situation, the rough estimate of the pose $x_{pR}$ is taken as equal to the last pose estimated for the video camera 4. Such an approximation is acceptable because the current image capture frequency is high, i.e. greater than 10 Hz or 20 Hz. For example, in the situation described here, the acquisition frequency is greater than or equal to 30 Hz.

Once the reference image has been selected during an operation 68, the pose $x_{pR}$ and the speed $x_{vR}$ are estimated.

To be more precise, here there are estimated the variations $x_p$ and $x_v$ of the pose and the speed, respectively, of the video camera 4 since the latest pose and speed that were estimated, i.e. the variations of the pose and the speed since the latest current image that was captured. Accordingly, $x_{pR}=x_{pR-1}+x_p$ and $x_{vR}=x_{vR-1}+x_v$, where $x_{pR-1}$ and $x_{vR-1}$ are the pose and the speed of the video camera 4 estimated for the preceding current image.

To this end, for each pixel of the reference image I* that corresponds to a pixel in the image I, a search is performed for the pose $x_p$ and the speed $x_v$ that minimize the difference $E_1$ between the terms p*) and $I*_b(x, p*)$, where x is a vector that groups the unknowns to be estimated. In this embodiment, the vector x groups the coordinates of the pose $x_p$ and the speed $x_v$. The variable x therefore includes twelve coordinates to be estimated.

However, in this first embodiment, to limit the number of unknowns to be estimated and therefore to enable faster estimation of the pose $x_p$ and the speed $x_v$, it is assumed here that the speed $x_{vR}$ is constant between the moments of capturing two successive current images. Under these conditions, the pose $x_p$ is linked to the estimate of the speed $x_{vR}$ by the following equation: $x_{vR}=x_p/t_p$, where $t_p$ is the current image acquisition period. Consequently, in this first embodiment, there are only six coordinates to be estimated, for example the six coordinates of the speed $x_v$.

The difference $E_1$ is minimized by successive iterations. To be more precise, to this end, the following operations are reiterated:

1) Choosing a value for the speed $x_v$,
2) Calculating the value of the difference $E_1$ for that value.

The operations 1) and 2) are reiterated in a loop. During the operation 1) the chosen value is modified on each iteration to attempt each time to find a new value of the speed $x_v$ that further reduces the difference $E_1$ more than the previous values attempted.

Typically, the number of iterations is stopped when a stop criterion is satisfied. For example, the iterations are stopped when a value of the speed $x_v$ makes it possible to obtain a value of the difference $E_1$ below a predetermined threshold $S_1$. Another possible stopping criterion consists in systematically stopping the iterations of the operations 1) and 2) if the number of iterations carried out is above a predetermined threshold $S_2$.

During the first iteration, an initial value must be assigned to the speed $x_v$. For example, that initial value is taken equal to zero, i.e. to a first approximation the speed $x_{vR}$ is taken not to have varied since it was last estimated.

After an iteration of the operations 1) and 2), the automatic choice of a new value of the speed $x_v$ likely to minimize the difference $E_1$ is a well known difference minimizing operation. Methods making it possible to choose this new value of the speed $x_v$ are described in the following bibliographic references, for example:

MALIS, E. (2004). Improving vision-based control using efficient second-order minimization techniques. In *IEEE International Conference on Robotics and Automation*, 1843-1848. 15, 30

BENHIMANE, S., & MALIS, E. (2004). Real-time image-based tracking of planes using efficient second-order minimization. In *IEEE International Conference on Intelligent Robots and Systems*, 943-948. 30

Other, even more robust methods are described in the following bibliographic references:

HAGER, G. & BELHUMEUR, P. (1998). Efficient region tracking with parametric models of geometry and illumination.

*IEEE Transactions on Pattern Analysis and Machine Intelligence,* 20, 1025-1039. 31, 100

COMPORT, A. I., MALIS, E. & RIVES, P. (2010). Real-time quadrifocal visual odometry. *The International Journal of Robotics Research,* 29, 245-266. 16, 19, 21, 31, 102

ZHANG, Z. (1995). *Parameter Estimation Techniques: A Tutorial with Application to Conic Fitting.* Tech. Rep. RR-2676, INRIA. 31, 32

Consequently, choosing a new value for the speed $x_v$ after each iteration will not be described in more detail here. There will only be described now the detailed method for calculating the various terms of the difference $E_1$ for a given value of the speed $x_v$.

Figure 3:
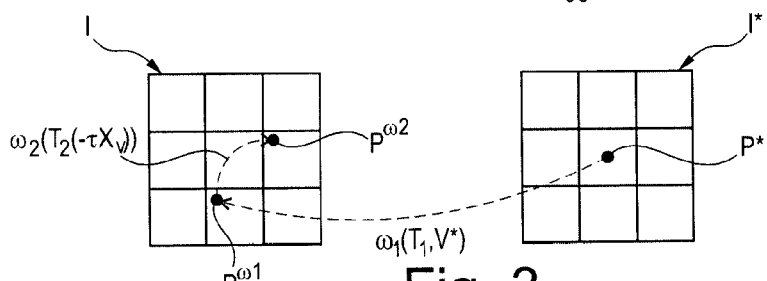
FIG. 3 is a diagrammatic illustration of a step for determining corresponding points between a reference image and a current image.

The term $I_w(x,p*)$ corresponds to the value of the luminous intensity of the point p* in the reference image constructed from the luminous intensities measured in the current image taking into account the RS distortion. The construction of the value of this term from a given value of the speed $x_v$ is illustrated diagrammatically in FIG. 3. To simplify FIG. 3, only a square of 3 by 3 pixels is represented for each image I and I*.

Here $I_w(x,p*)$ corresponds to the following composition of functions:

$$I(w_2(T_2(-\tau x_{vR})), w_1(T_1, v*)).$$

These various functions will now be explained. The vertex v* corresponds to the coordinates expressed in the frame of reference F*, of the point PS photographed by the pixel centered on the point p* of the image plane PL*.

In a first time, the unit 12 seeks the point $p^{w1}$ (FIG. 3) of the current image corresponding to the point p* by first assuming that the time $t_A$ is zero. The points $p^{w1}$ and p* correspond if they both photograph the same point PS of the scene 6. If the time $t_A$ is zero, numerous known algorithms make it possible to find the coordinates of the point $p^{w1}$ in the image I corresponding to the point p* in the image I*. Consequently, here, only general information on one possible method for doing this is given.

For example, the unit 12 selects in the reference image the coordinates v* of the point PS associated with the point p*. After that, the unit 12 effects a change of frame of reference to obtain the coordinates v of the same point PS expressed in the frame of reference F of the video camera 4. A pose matrix $T_1$ is used for this. Pose matrices are well known. The reader may consult chapter 2 of the book L1 for more information.

The pose matrices take the following form if homogeneous coordinates are used:

$$T = \begin{bmatrix} R & t \\ 0 & 1 \end{bmatrix}$$

where:
R is a rotation matrix, and
t is a translation vector.

The matrix R and the vector t are functions of the pose $x_{pR}*$ and the pose $x_{pR}$ associated with the images I* and I, respectively. The pose $x_{pR}*$ is known from the model 16. The pose $x_{pR}$ is equal to $x_{pR-1}+x_p$.

Once the coordinates v of the point PS in the frame of reference F have been obtained, they are projected by a function onto the plane PL of the image I to obtain the coordinates of a point $p^{w1}$. The point $p^{w1}$ is the point that corresponds to the intersection of the plane PL and the axis AO that passes through the center C and the point PS of the scene 6.

The function $w_1(\ldots)$ that returns the coordinates of the point $p^{w1}$ corresponding to the point $p^*$ is known as warping. It is typically a question of central projection with center C. It has parameters set by the function $T_1$. Accordingly, $p^{w1}=w_1(T_1,p^*)$ At this stage, it will already have been noted that the point $p^{w1}$ is not necessarily at the center of a pixel of the image I.

Because of the rolling shutter effect, the row of pixels to which the point $p^{w1}$ of the image belongs was not captured at the same time as the first row of the image, but at a time τ after that first row was captured. Here the first row of the image I captured is the row at the bottom of the image, as shown in FIG. 2A. The pose $x_{pR}$ that is estimated is the pose of the video camera 4 at the moment at which the latter captures the bottom row of the current image.

The time τ may be calculated as being equal to $(n+1)t_\Delta$, where n is the number of rows of pixels that separate the row to which the point $p^{w1}$ belongs and the first row captured. Here the number n is determined from the ordinate of the point $p^{w1}$. To be more precise, a function $e_1(\ldots)$ is defined that returns the number n+1 as a function of the ordinate of the point $p^{w1}$ in the plane of the image. The time τ is therefore given by the following equation: $\tau = t_\Delta e_1(p^{w1})$.

Moreover, as the video camera 4 moves at the speed $x_{vR}$ during the capture of the image, the pixel containing the point $p^{w1}$ has photographed not the point PS of the scene 6 but another point of the scene after the video camera 4 has been moved a distance $\tau x_{vR}$. To find the point $p^{w2}$ that has photographed the point PS, it is therefore necessary to move the point $p^{w1}$ in the opposite direction and then to project it again onto the plane PL.

This is effected with the aid of the following composition of functions:

$$w_2(T_2(-\tau x_{vR}),p^{w1})$$

where:

$T_2(-\tau x_{vR})$ is a function that returns the coordinates of a point $p^{T2(-\tau xvR)}$ of the three-dimensional space corresponding to the position of the point $p^{w1}$ after the latter has been moved in the direction opposite the movement of the video camera 4 during the time τ, $w_2(\ldots)$ is a warping function that returns the coordinates of the point $p^{w2}$ corresponding to the projection of the point $p^{T2(-\tau xvR)}$ onto the plane PL.

The point $p^{w2}$ is at the intersection of the plane of the current image and an optical axis passing through the center C and the point $p^{T2(-\tau xv\,R)}$.

It will be noted that the symbol "−" in the expression "$-\tau x_{vR}$" indicates that it is a movement in the opposite direction to the movement $\tau x_{vR}$. The function $T_2$ integrates the speed $-x_{vR}$ over the time τ to obtain a displacement equal to the displacement of the video camera 4 during the time τ but in the opposite direction. Here the speed $x_{vR}$ is considered as constant during the time τ. The distance travelled by the video camera 4 during the time τ at the speed $x_{vR}$ is calculated by integrating that speed over the time τ. For example, to this end, the function $T_2(\ldots)$ is the following exponential matrix:

$$T_2(-\tau x_{vR})=\exp(-\tau[x_{vR}]^\wedge)$$

where:

$\exp(\ldots)$ is the exponential function, and:

$[x_{vR}]^\wedge$ is defined by the following matrix:

$$\begin{bmatrix} [\omega]_x & v \\ 0 & 0 \end{bmatrix} \in se(3)$$

In the above equation, the vector v corresponds to the three coordinates of the speed in translation of the video camera 4 and the symbol $[w]_x$ is the skew symmetric matrix of the angular speed of the video camera 4, i.e. the following matrix:

$$[\omega]_x = \begin{bmatrix} 0 & -\omega_z & \omega_y \\ \omega_z & 0 & -\omega_x \\ -\omega_y & \omega_x & 0 \end{bmatrix}$$

in which $\omega_x$, $\omega_y$ and $\omega_z$ are the angular speeds of the video camera 4 about the axes X, Y and Z, respectively, of the frame of reference R.

Like the point $p^{w1}$, the point $p^{w2}$ does not necessarily fall at the center of a pixel. It is therefore then necessary to estimate the luminous intensity at the level of the point $p^{w2}$ from the luminous intensities stored for the adjacent pixels in the current image. This is the role of the function $I(\ldots)$ that returns the luminous intensity at the level of the point p that has been interpolated on the basis of the luminous intensities stored for the pixels adjacent that point p. Numerous interpolation functions are known. For example, the simplest consists in returning the stored intensity for the pixel within which the point $p^{w2}$ is situated.

If it is assumed that the light radiated by the point PS of the scene 6 does not vary over time and that it is the same whatever the point of view, then the intensity $I(p^{w2})$ must be the same as the intensity $I^*(p^*)$ stored in the reference image $I^*$ after taking account of the RS distortion.

Nevertheless, it has been assumed here that motion blur in the current image is not negligible. The luminous intensities measured by the pixels of the current image are therefore affected by motion blur whereas the luminous intensities stored for the pixels of the reference image are not affected by motion blur. The estimated intensity $\tilde{I}(p^{w2})$ is therefore affected by motion blur because it is constructed from the luminous intensities of the pixels of the current image in which the MB distortion has not been corrected. Consequently, if the exposure time $t_e$ is not negligible, the intensity $\tilde{I}(p^{w2})$ therefore does not correspond exactly to the intensity $I^*(p^*)$ even if the RS distortion has been eliminated or at least reduced.

In this embodiment, it is for this reason that it is not the difference between the terms $I_w(x, p^*)$ and $I^*(p^*)$ that is minimized directly but the difference between the terms $I_w(x, p^*)$ and $I^*_b(x, p^*)$.

The term $I^*_b(x, p^*)$ is a value of the luminous intensity that would be measured at the level of the point $p^*$ if the exposure time of the pixels of the video camera 22 were equal to that of the video camera 4 and if the video camera 22 were moved at the speed $x_{vR}$ during the capture of the reference image $I^*$. In other words, the image $I^*_b$ corresponds to the image $I^*$ after a motion blur identical to that affecting the current image I has been added to the reference image.

To simulate the MB distortion in the reference image, the term $I^*_b(x, p^*)$ is constructed:

by selecting points adjacent the point $p^*$ of the image $I^*$ that would have photographed the same point of the scene 6 as photographed by the point p* if the video camera 22 were moved at the speed $x_{vR}$ during the exposure time $t_e$, and then by combining the intensities of the adjacent points so selected with that of the point p* so as to generate a new intensity at the level of the point p* with motion blur.

Here the coordinates of the adjacent points are obtained with the aid of the composition of functions $w_3(T_1^{-1}T_2(-tx_{vR})T_1, p^*)$. The composition of functions $T_1^{-1}T_2(-tx_{vR})T_1$ performs the following operations:

the pose matrix $T_1$ transforms the coordinates v* of the point PS of the scene 6 expressed in the frame of reference F* into coordinates v of that same point expressed in the frame of reference F, where v* are the coordinates of the point PS photographed by the point p*, $T_2(-tx_{vR})$ moves the point PS a distance that is a function of a time t and the speed $x_{vR}$, to obtain the coordinates of a new point $p^{T2(-txv\,R)}$ expressed in the frame of reference F, where t is a time between zero and the exposure time $t_e$ of the pixel, and the pose matrix $T_1^{-1}$ transforms the coordinates of the point $p^{T2(-txvR)}$ expressed in the frame of reference F into coordinates expressed in the frame of reference F*.

Here the fact is exploited that moving the video camera a distance $tX_{vR}$ relative to a fixed scene is equivalent to moving the fixed scene a distance $-tx_{vR}$ relative to a fixed video camera.

The functions $T_1$ and $T_2$ are the same as those described above. The function $T_1^{-1}$ is the inverse of the pose matrix $T_1$.

The function $w_3(\ldots)$ is a warping function that projects a point of the scene onto the plane PL* to obtain the coordinates of a point that photographs that point of the scene. This is typically a central projection with center C*. The point $p^{w3}$ is therefore here the point situated at the intersection of the plane PL* and the axis passing through the center C* and the point $p^{T2(-txvR)}$.

The coordinates of a point adjacent the point p* are obtained for each value of the time t. In practice, at least 5, 10 or 20 values of the time t regularly distributed in the range [0; $t_e$] are used.

The intensity at the level of a point in the reference image is obtained with the aid of a function $I^*(p^{w3})$. The function $I^*(\ldots)$ is the function that returns the intensity at the level of the point $p^{w3}$ in the reference image I*. The point $p^{w3}$ is not necessarily at the center of a pixel. Accordingly, like the function $I(\ldots)$ described above, the function $I^*(\ldots)$ returns an intensity at the level of the point $p^{w3}$ constructed by interpolation from the intensity stored for the pixels adjacent the point $p^{w3}$.

The intensity $I^*_b(p^*)$ is then taken as equal to the mean of the intensities $I^*(p^{w3})$ calculated for the various times t. For example, here this is the arithmetic mean using the same weighting coefficient for each term.

After each iteration that minimizes the difference $E_1$, the pose matrix $T_1$ is updated with the new estimate of the pose $x_{pR}$ obtained from the new estimate of the pose $x_{vR}$.

Following a number of iterations of the operation 68, the pose $x_{pR}$ and the speed $x_{vR}$ can be used for various additional processing operations. These additional processing operations are typically performed in real time if they do not take too long to execute. Otherwise they are executed off-line, i.e. after all the poses $x_{pR}$ and speeds $x_{vR}$ of the video camera 4 have been calculated. Here, by way of illustration, only a step 70 of constructing the trajectory of the video camera 4 is performed in real time.

During the operation 70, after each new estimate of the pose $x_{pR}$ and the speed $x_{vR}$, the unit 12 stores the succession of estimated poses $x_{pR}$ in the form of a temporally ordered series. This temporally ordered series then constitutes the trajectory constructed for the video camera 4.

By way of illustration, the unit 12 also effects various processing operations off line. For example, during a step 72, the unit 12 processes the current image to limit the RS distortion using the estimate of the speed $x_{vR}$. To this end, the pixels of the current image are typically shifted as a function of the speed $x_{vR}$ and the time τ. For example, this shifting of each pixel is estimated by the function $w_2(T_2(-\tau x_{vR}),p)$ for each pixel p of the current image. Such image processing methods are known and are therefore not described in more detail here. For example, such methods are described in the following paper: F. Baker, E. P. Bennett, S. B. Kang, and R. Szeliski, *Removing rolling shutter wobble*", IEEE, Conference on Computer Vision and Pattern recognition, 2010.

In parallel with this, during a step 74, the unit 12 also processes the current image to limit the distortion caused by motion blur. Such image processing methods based on the estimate of the speed $x_{vR}$ of the video camera at the moment at which it captured the image are known. For example, such methods are described in the following papers:

N. Joshi, F. Kang, L. Zitnick, R. Szeliski, "Image deblurring with inertial measurement sensors", ACM Siggraph, 2010, and F. Navarro, F. J. Seròn and D. Gutierrez, "*Motion blur rendering: state of the art*", Computer Graphics Forum, 2011.

Figure 5:
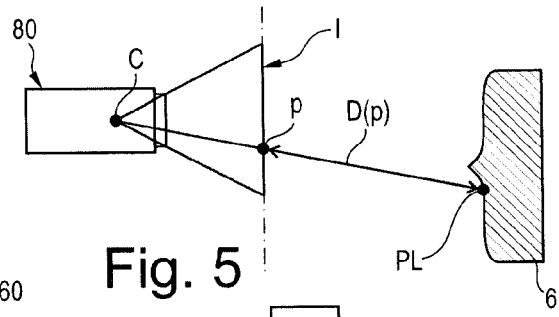
FIG. 5 is an illustration of another embodiment of a video camera that can be used in the system from FIG. 1.

FIG. 5 represents a system identical to that from FIG. 1 except that the video camera 4 is replaced by a video camera 80. To simplify FIG. 5, only the video camera 80 is shown. This video camera 80 is a video camera identical to the video camera 22 or simply the same video camera as the video camera 22. In the video camera 80, the depth is acquired by the rolling shutter effect as described with reference to FIG. 2A. The rows of pixels capture the depths one after the other. The time between the moments of capture of the depth by two successive rows of pixels is denoted $t_{\Delta d}$. The time $t_{\Delta d}$ may be equal to the time $t_\Delta$ for the capture of the intensities or not.

The exposure time of the pixels for capturing the depth is denoted $t_{ed}$. The time $t_{ed}$ is equal to the exposure time $t_e$ or not. The video camera 80 acquires for each pixel the same information as the video camera 4 and additionally a vertex v coding in the frame of reference F tied with no degree of freedom to the video camera 80 the depth of the point of the scene photographed by that pixel.

Figure 6:
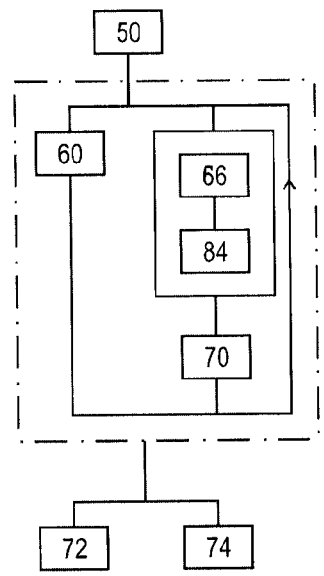
FIG. 6 is a flowchart of a method for estimating the speed of the video camera from FIG. 5.

The operation of the system from FIG. 1 in which the video camera 4 is replaced by the video camera 80 will now be explained with reference to the FIG. 6 method. This method is identical to that from FIG. 4 except that the operation 68 is replaced by an operation 84. During the operation 84, the pose $x_p$ and the speed $x_v$ are estimated by minimizing, in addition to the difference $E_1$ described above, a difference $E_2$ between the following terms: $D_w(x,p^*)$ and $D^*_b(x,p^*)$. The term $D_w(x,p^*)$ corresponds to the estimate of the depth measured at the level of the point p* of the reference image constructed from the depths stored in the current image and taking account of the RS distortion.

Here the term $D_w(x,p^*)$ is the composition of the following functions:

$$D(w_2(T_2(-\tau_d x_{vR})),w_1(T_1,v^*))$$

Here this is the same composition of functions as described above for the intensity $I(\ldots)$ but with the function $I(\ldots)$ replaced by the function $D(\ldots)$. The function D( . . . ) returns the value of the depth at the level of the point $p^{w2}$. Like the intensities, the depth at the level of the point $p^{W2}$ is estimated by interpolation from the depths measured by the pixels adjacent the point $p^{W2}$ in the current image. The time $\tau_d$ is the time calculated like the time $\tau$ but replacing $t_\Delta$ by $t_{\Delta d}$.

The term $D_w(x,p^*)$ is therefore an approximation of the depth at the level of the point $p^*$ in the reference image constructed from the depths measured by the video camera 80.

The term $D^*_b(x,p^*)$ corresponds to the depths that would be measured at the level of the point $p^*$ if the video camera 22 were moved at the speed $x_{vR}$ and if the exposure time of the pixels of the video camera 22 for measuring the depth were equal to the exposure time $t_{ed}$. Here the term $D^*_b(x,p^*)$ is constructed in a similar manner to that described for the term $I^*_b(x,p^*)$. The term $D^*_b(x,p^*)$ is therefore constructed:
by selecting points adjacent the point $p^*$ of the image $I^*$ that would have photographed the same point of the scene as photographed by the point $p^*$ if the video camera 22 were moved at the speed $x_{vR}$ during the exposure time $t_{ed}$, then
by combining the depths of the adjacent points so selected with that of the point $p^*$ so as to generate a new depth at the level of the point $p^*$ with motion blur.

The adjacent points are selected in exactly the same way as described above for the term $I^*_b(x,p^*)$ except that the time $t_e$ is replaced by the time $t_{ed}$. The depth measured by the adjacent points is obtained with the aid of a function $D^*( \ldots )$. The function $D^*(p^{w3})$ is the function that returns the depth at the level of the point $p^{w3}$ based on the depths measured for the pixels adjacent the point $p^{w3}$.

Moreover, in this particular case, it is assumed that the times $t_\Delta$, $t_{\Delta d}$, $t_e$ and $t_{ed}$ are unknowns. The variable x therefore includes in addition to the six coordinates of the speed $x_v$ four coordinates intended to code the values of the times $t_\Delta$, $t_{\Delta d}$, $t_e$ and $t_{ed}$. The steps of simultaneous minimization of the differences $E_1$ and $E_2$ therefore lead also to estimating in addition to the speed $x_v$ the value of the times $t_\Delta$, $t_{\Delta d}$, $t_e$ and $t_{ed}$.

Figure 7:
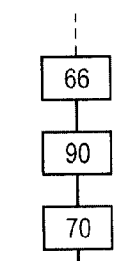
FIG. 7 is a partial illustration of another method for estimating the speed of the video camera of the system from FIG. 1.

FIG. 7 shows another method for estimating the pose $x_{pR}$ and the speed $x_{vR}$ of the video camera 4 with the aid of the system 2. This method is identical to that from FIG. 4 except that the operation 68 is replaced by an operation 90. To simplify FIG. 7, only the portion of the method including the operation 90 is shown. The other portions of the method are identical to those described above.

Figure 8:
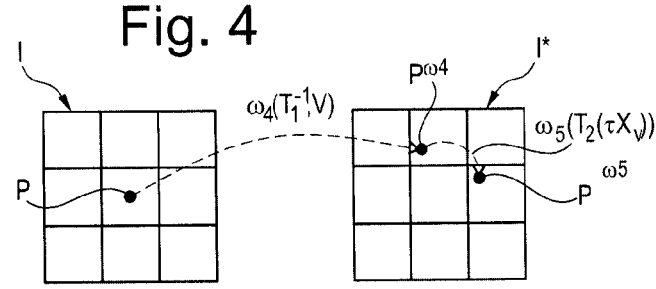
FIG. 8 is a diagrammatic illustration of a step of determining corresponding points in the current image and the reference image.

The operation 90 will now be explained with reference to FIG. 8. In FIG. 8, the same simplifications have been applied as in FIG. 3.

During the step 90, the pose $x_p$ and the speed $x_v$ are estimated by minimizing a difference $E_3$ between the following terms: $I^*_w(x,p)$ and $I(p)$.

The term $I(p)$ is the intensity measured at the level of the point p by the video camera 4.

The term $I^*_w(x,p)$ corresponds to the estimate of the intensity at the level of the point p of the current image constructed from the intensities stored in the reference image $I^*$ taking account of the RS and MB distortion of the video camera 4. Here the term $I^*_w(x,p)$ corresponds to the following composition of functions:

$$I^*_b(w_5(T_2(\tau x_{vR}), w_4(T_1^{-1}, v)))$$

The vertex v contains the coordinates in the frame of reference F of the point PS photographed by the point p. This vertex v is estimated from the vertices $v^*$ of the reference image. For example, there is initially a search for the points $p^{w1}$ closest to the point p, after which the vertex v is estimated by interpolation from the coordinates $T_1 v^*$ of the vertices associated with these closest points $p^{w1}$.

$T_1^{-1}$ is the pose matrix that is the inverse of the matrix $T_1$. It therefore transforms the coordinates of the vertex v expressed in the frame of reference F into coordinates $v^*$ expressed in the frame of reference $F^*$. The function $w_4$ is a warping function that projects the vertex $v^*$ onto the plane PL* of the reference image to obtain the coordinates of a point $p^{w4}$ (FIG. 8). The function $w_4( \ldots )$ is identical to the function $w_3$, for example.

In this embodiment, the aim is to obtain the intensity that would have been measured at the level of the point $p^{w4}$ if the video camera 22 were a rolling shutter video camera identical in this regard to the video camera 4. To this end, it is necessary to shift the point $p^{w4}$ as a function of $\tau$ and the speed $x_{vR}$. Here this shift is $T_2(\tau x_{vR})$, i.e. the same as for the method from FIG. 4 but in the opposite direction. After shifting the point $p^{w4}$ by $T_2(\tau x_{vR})$ a point $p^{T2(\tau xvR)}$ is obtained. After projection of the point $p^{T2(\tau vR)}$ into the plane PL* by the function $w_5( \ldots )$, the coordinates of the point $p^{w5}$ are obtained.

The function $I^*_b( \ldots )$ is the same as that defined above, i.e. it makes it possible to estimate the value of the intensity at the level of the point $p^{w5}$ that would be measured by the pixels of the video camera 22 if its exposure time were equal to $t_e$ and if the video camera 22 were moved at the speed $x_{vR}$. The function $I^*_b( \ldots )$ therefore introduces the same motion blur into the reference image as that observed in the current image.

The values of the pose $x_p$ and the speed $x_v$ that minimize the difference $E_3$ are estimated as in the case described for the difference $E_1$.

Figure 4:
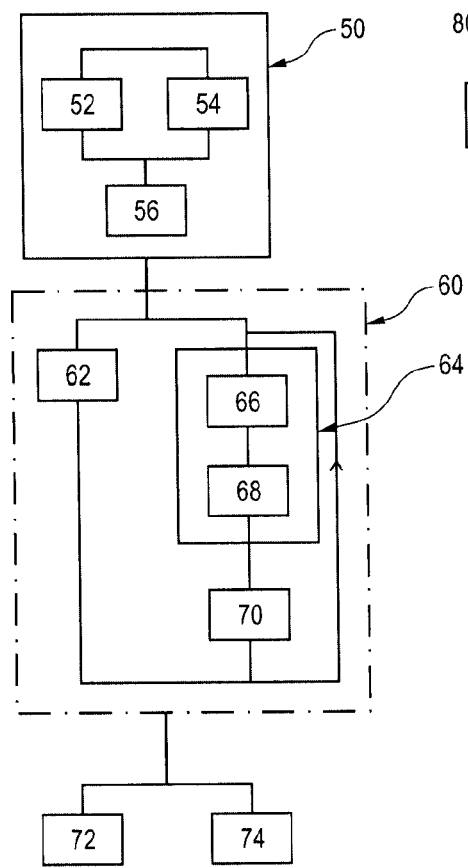
FIG. 4 is a flowchart of a method for estimating the speed of a video camera and for processing the images captured by that video camera.
Figure 9:
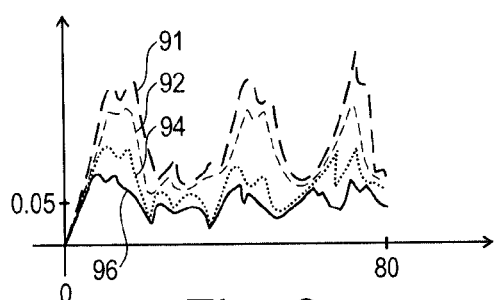
FIG. 9 is a timing diagram showing the evolution over time of the error between the estimated speed and the real speed in four different situations.

FIG. 9 represents the evolution over time of the difference between the angular speed estimated using the method from FIG. 4 and the real angular speed of the video camera 4. The curves represented were obtained experimentally. Each curve represented was obtained using the same sequence of current images and the same reference images. In FIG. 9, the abscissa axis represents the number of current images processed and the ordinate axis represents the error between the real angular speed and the estimated angular speed. Here that error is expressed in the form of a root mean square error (RMSE).

The curve 91 represents the evolution of the error without correcting the RS and MB distortions. In this case, the estimates of the speed $x_v$ are obtained using the method from FIG. 4, for example, but taking the time $t_e$ and the time $t_\Delta$ as equal to zero.

The curve 92 corresponds to the situation where only the RS distortion is corrected. This curve is obtained by executing the method from FIG. 4 taking a non-zero value for the time $t_\Delta$ and fixing the time $t_e$ at zero.

The curve 94 corresponds to the situation in which only the MB distortion is corrected. This curve is obtained by executing the method from FIG. 4 taking a non-zero value for the time $t_e$ and fixing the time $t_\Delta$ at zero.

Finally, the curve 96 corresponds to the situation in which the RS and MB distortions are corrected simultaneously. This curve is obtained by executing the method from FIG. 4 taking non-zero values for the time $t_e$ and the time $t_\Delta$.

As these curves illustrate, in the situation tested experimentally improved results are obtained as soon as the RS and/or MB distortion is taken into account. Unsurprisingly, the best results are obtained when both the RS and MB distortions are taken into account simultaneously. In the situation tested, taking into account only the MBdistortion (curve 94) gives better results than taking into account only the RS distortion (curve 92).

Numerous other embodiments are possible. For example, the unit 24 may be inside the video camera 22. The video camera 22 can also include sensors that directly measure its pose within the scene 6 without having to perform any image processing for this. For example, one such sensor is an inertial sensor that measures the acceleration of the video camera 22 along three orthogonal axes.

The video cameras 22 and 4 may be identical or different. The video cameras 22 and 4 may measure the intensity of the radiation emitted by a point of the scene at wavelengths other than those visible by a human. For example, the video cameras 22 and 4 may operate in the infrared.

The unit 12 may be inside the video camera 4 to perform the processing operations in real time. Nevertheless, the unit 12 may also be mechanically separate from the video camera 4. In this latter case, the images captured by the video camera 4 are downloaded into the memory 10 in a second step and then processed by the unit 12 afterwards.

The three-dimensional model 16 of the scene 6 may differ from a model based on reference images. For example, the model 16 may be replaced by a three-dimensional volumetric computer model of the scene 6 produced using computer-assisted design, for example. Thereafter, each reference image is constructed on the basis of this mathematical model. More details of these other types of three-dimensional models can be found in the paper A1.

The reference image may be an image selected in the model 16 or an image constructed from the images contained in the model 16. For example, the reference image can be obtained by combining a plurality of images contained in the model 16, as described in the paper A1, so as to obtain a reference image the pose of which is closer to the estimated pose of the current image.

In another variant, the model 16 is not necessarily constructed beforehand during a learning phase. To the contrary, it may be constructed as the video camera 80 is moved within the scene 6. The simultaneous construction of the trajectory of the video camera 80 and of the map of the scene 6 is known as simultaneous localization and mapping (SLAM). In this case, the images from the video camera 80 are added to the model 16 as they are moved within the scene 6, for example. Before adding a reference image to the model 16, the latter is preferably processed to limit the RS and/or MB distortion as described in the steps 72 and 74. In this variant the phase 50 and the device 20 are omitted.

Numerous other embodiments of the method are equally possible. For example, the estimate $x_{pR}$ of the pose of the video camera 4 may be obtained in a different manner. For example, the video camera 4 is equipped with a sensor measuring its pose in the scene, such as an inertial sensor, and the pose $x_{pR}$ is estimated from measurements from this sensor inside the video camera 4.

In another embodiment, the differences $E_1$ or $E_3$ are calculated not for a single reference image but for a plurality of reference images. Thus in the method from FIG. 4 the difference $E_1$ is then replaced by the differences $E_{1,1}$ or $E_{1,2}$ where the difference $E_{1,1}$ is calculated from a first reference image and the difference $E_{1,2}$ is calculated from a second reference image separate from the first.

It is equally possible to use models other than the pinhole model to model a video camera, in particular, the pinhole model is preferably complemented by a model of the radial distortions to correct the aberrations or distortions caused by the lenses of the video camera. Such distortion models can be found in the following paper: SLAMA, C. C. (1980). *Manual of Photogrammetry*. American Society of Photogrammetry, 4th edn. 24.

Alternatively, the coordinates of the pose $x_{pR}$ may be considered as being independent of the speed $x_{vR}$. In this case, the same method as described above is used except that the variable x will contain the six coordinates of the pose $x_p$ as well as the six coordinates of the speed $x_v$. Conversely, it is possible for the number of degrees of freedom of the video camera 4 or 80 to be less than 6. This is the case if the video camera can move only in a horizontal plane or cannot turn on itself, for example. This limitation of the number of degrees of freedom in movement is then taken into account by reducing the number of unknown coordinates necessary for determining the pose and the speed of the video camera. Similarly, in another variant, if it is necessary to estimate the acceleration $x_a$ of the video camera 4 at the moment at which it captures the image, six additional coordinates may be added to the variable x each corresponding to one of the coordinates of the acceleration $x_a$. The acceleration $x_a$ corresponds to the linear acceleration along the axes X, Y and Z and the angular acceleration about those same axes.

The various differences $E_1$, $E_2$ and $E_3$ described above may be used in combination or alternately. For example, the speed $x_v$ may be determined using only the difference $E_2$ between the depths. In this case it is not necessary for the video cameras 4 and 22 to measure and to store intensities for each pixel. Similarly, the method from FIG. 7 may be adapted to the situation in which the physical magnitude measured by the video camera 4 is the depth and not the luminous intensity. If the video camera 80 is used, it not necessary for the reference image to include a depth associated with each pixel. In fact, the vertex v is then known and the method from FIG. 7 may be used without having to use the vertices v*, for example.

Other functions are possible for estimating the opposite movement of the video camera 4 or 80 while it is capturing the current image. For example, instead of using the transformation $T_2(-\tau x_{vR})$, the transformation $T2^{-1}(\tau x_{vR})$ may also be used.

Nor is it necessary to use all of the pixels of the reference images and the current image that match. Alternatively, to reduce the number of calculations necessary to estimate the speed $x_v$, only 10% or 50% or 70% or 90% of the pixels of one of the images having corresponding pixels in the other image are taken into account when minimizing the differences $E_1$, $E_2$ or $E_3$.

If the motion blur in the images captured by the video camera 4 is negligible, then the function $I^*_b( \ldots )$ may be taken as equal to the function $I^*( \ldots )$. This therefore amounts to setting the time $t_e$ at zero in the equations described above.

Conversely, if the RS distortion is negligible in the images captured by the video camera 4 or merely if that video camera 4 is a global shuttering video camera, the function $I_w(p^*)$ is taken as equal to the function $I(w_1(T_1,v^*))$. This therefore simply amounts to taking the value of the time $t_A$ and/or the time $t_{AD}$ as equal to zero in the previous embodiments.

The times $t_A$, $t_{AD}$, $t_e$ and $t_{eD}$ may be measured during the learning phase or estimated during the first iterations in the utilization phase 60.

The estimate of the speed $x_{vR}$ may be used for image processing operations other than those described above.

The speed $x_{vR}$ and the pose $x_{pR}$ are not necessarily estimated in real time. For example, they may be estimated when the capture of the images by the video camera 4 or 80 has finished.

The invention claimed is:

1. A method for estimating the speed of movement of a first video camera at the moment at which that first video camera captures a current image of a three-dimensional scene, the current image including pixels organized in parallel rows, the rows of pixels having been captured one after the other so that a non-zero time $t_\Delta$ elapses between the moments of capture of two successive rows of the current image, this method including:
    a) storing in an electronic memory a reference image corresponding to an image of the same scene captured by a second video camera in a different pose, the reference image including pixels organized in parallel rows, the memory containing for each pixel of the reference image the measurement of a physical magnitude measured by that pixel, that physical magnitude being chosen in the group made up of the intensity of radiation emitted by the point photographed by that pixel and a depth separating that pixel from the point of the scene photographed by that pixel,
    b) storing in the electronic memory the current image, the memory containing for each pixel of the current image the measurement of a physical magnitude measured by that pixel, that physical magnitude being the same as the physical magnitude measured by the pixels of the reference image,
    c) storing in the electronic memory for each pixel of the reference image or of the current image the measurement of a depth that separates that pixel from the point of the scene photographed by that pixel,
    d) estimating the pose $x_{pR}$ of the first video camera,
    e) estimating the speed $x_{vR}$ of movement of the first video camera during the capture of the current image, wherein the step e) is executed by seeking the speed $x_{vR}$ that minimizes, for N points of the reference image, where N is an integer greater than 10% of the number of pixels of the reference image, a difference directly between:
        a first value of the physical magnitude at the level of a first point of the reference image, that first value being constructed from at least one measurement of that physical magnitude stored in that reference image, and
        a second value of the same physical magnitude at the level of a second point of the current image, that second value being constructed from measurements of that physical magnitude stored in the current image and the coordinates of the second point, the coordinates of the second point in the plane of the current image being obtained:
        by determining the coordinates of a third point in the plane of the current image that corresponds to the projection onto that plane of the point of the scene photographed by the first point, those coordinates being determined from the estimated pose $x_{pR}$ and the measurements of the depths stored in the current image or the reference image, then
        by shifting the third point a distance equal and opposite to the distance traveled by the first video camera between a time $t_1$ at which a first row of the current image is captured and a time $t_i$ at which the row of pixels to which the third point belongs was captured, that distance being a function of the time $t_\Delta$ and the speed $x_{vR}$, and finally
        by projecting the third point shifted in this way onto the plane of the current image to obtain the coordinates of the second point.

2. The method as claimed in claim 1, wherein, during the step e), the coordinates of the second point are obtained with the aid of the following relation:

$$p^{w2}=w_2(T_2(-\tau x_{vR}p^{w1}),$$

where:
    $p^{w2}$ and $p^{w1}$ are respectively the coordinates of the second and third points in the plane of the current image,
    $\tau$ is the time that has elapsed between the time $t_1$ and the time $t_i$,
    $T_2(-\tau x_{vR})$ is a function that returns the opposite of the distance traveled by the first video camera between the times $t_1$ and $t_i$ by integrating the speed $-x_{vR}$ during the time $\tau$, and
    $w_2(\ldots)$ is a central projection that returns the coordinates in the plane of the current image of the third point after it has been shifted by the distance $T_2(-\tau x_{vR})$, this central projection being a function of intrinsic parameters of the first video camera notably including its focal length.

3. The method as claimed in claim 2, wherein the method includes calculating the time $\tau$:
    by identifying the row of pixels of the current image to which the third point belongs from the coordinates of that third point in the plane of the current image, and
    by multiplying the time $t_\Delta$ by n+1, where n is the number of rows that separate the row so identified from the first row captured in the current image.

4. The method as claimed in claim 1, wherein the value of the physical magnitude at the level of the point of the reference image, called the reference point, is constructed:
    by selecting points adjacent the reference point, each adjacent point corresponding to the projection onto the plane of the reference image of a third point the coordinates of which are obtained by shifting the second point a distance $T_2(-tx_{vR})$, where t is a time elapsed since the beginning of an exposure time $t_e$, that time being less than or equal to the exposure time $t_e$, and $T_2(\ldots)$ is a function that integrates the speed $x_{vR}$ during the time t, each adjacent point corresponding to a respective value of the time t and the time $t_e$ being equal to the exposure time of the first video camera, then
    by averaging the values of the physical magnitude at the level of the selected adjacent points and the reference point so as to generate a new value of the physical magnitude at the level of the reference point, that new value constituting an estimate of that which would be measured if the exposure time of the pixels of the second video camera were equal to $t_e$ and if the second video camera were to move at the speed $x_{vR}$ during the exposure time $t_e$, the values of the physical magnitude at the level of the adjacent points being obtained from the measurements stored in the reference image and the coordinates of the adjacent points.

5. The method as claimed in claim 1, wherein the speed $x_{vR}$ is a vector with six coordinates coding the speed of movement in translation and in rotation of the first video camera along three mutually orthogonal axes so that during the step e) the speed in translation and in rotation of the first video camera is estimated.

6. The method as claimed in claim 1, wherein during the step e) the coordinates of the pose $x_{pR}$ are considered as being unknowns to be estimated so that the steps d) and e) are then executed simultaneously by simultaneously seeking the pose $x_{pR}$ and the speed $x_{vR}$ that minimize the difference between the first and second values of the physical magnitude.

7. The method as claimed in claim 6, wherein while the simultaneously seeking the pose $x_{pR}$ and the speed $x_{vR}$, the coordinates of the pose $x_{pR}$ are defined by the relation $X_{pR}=t_p X_{vR}+x_{pR-1}$, where $x_{pR-1}$ is the estimate of the pose of the first video camera at the moment at which that first video camera captured the preceding current image and $t_p$ is the time that separates the moment of capture of the current image from the moment of capture of the preceding current image by the first video camera so that only six coordinates are to be estimated during the steps d) and e) to obtain simultaneously estimates of the speed $x_{vR}$ and the pose $x_{pR}$.

8. A method for estimating the speed of movement of a first video camera at the moment at which that first video camera captures a current image of a three-dimensional scene, the current image including pixels organized in parallel rows, the rows of pixels having been captured one after the other so that a non-zero time $t_\Delta$ elapses between the moments of capture of two successive rows of the current image, this method including:
 a) storing in an electronic memory a reference image corresponding to an image of the same scene captured by a second video camera in a different pose, the reference image including pixels organized in parallel rows, the memory containing for each pixel of the reference image the measurement of a physical magnitude measured by that pixel, that physical magnitude being chosen in the group made up of the intensity of radiation emitted by the point photographed by that pixel and a depth separating that pixel from the point of the scene photographed by that pixel,
 b) storing in the electronic memory the current image, the memory containing for each pixel of the current image the measurement of a physical magnitude measured by that pixel, that physical magnitude being the same as the physical magnitude measured by the pixels of the reference image,
 c) storing in the electronic memory for each pixel of the reference image or of the current image the measurement of a depth that separates that pixel from the point of the scene photographed by that pixel,
 d) estimating a pose $x_{pR}$ of the first video camera,
 e) estimating the speed $x_{vR}$ of movement of the first video camera during the capture of the current image, wherein the step e) is executed by seeking the speed $x_{vR}$ that minimizes, for N points of the current image, where N is an integer greater than 10% of the number of pixels of the current image, a difference directly between:
  a first value of the physical magnitude at the level of a first point of the current image, that first value being constructed from at least one measurement of that physical magnitude stored in that current image, and
  a second value of the same physical magnitude at the level of a second point of the reference image, that second value being constructed from measurements of that physical magnitude stored in the reference image and the coordinates of the second point in the plane of the reference image, the coordinates of the second point being obtained:
   by determining the coordinates of a third point in the plane of the reference image that corresponds to the projection onto that plane of the point of the scene photographed by the first point, those coordinates being determined from the estimated pose $x_{pR}$ and the measurements of the depths stored in the current image or the reference image, then
   by shifting the third point a distance equal to and in the same direction as the distance traveled by the first video camera between a time $t_1$ at which a first row of the current image is captured and a time $t_i$ at which the row of pixels to which the first point belongs was captured, that distance being a function of the time $t_\Delta$ and the speed $x_{vR}$, and finally
   by projecting the third point shifted in this way onto the plane of the reference image to obtain the coordinates of the second point.

9. The method as claimed in claim 8, wherein, during the step e), the coordinates of the second point are obtained with the aid of the following relation:

$$p^{w5}=w_5(T_2(\tau x_{vR})),p^{w4}),$$

where:
 $p^{w5}$ and $p^{w4}$ are respectively the coordinates of the second and third points in the plane of the reference image,
 $\tau$ is the time that has elapsed between the time $t_1$ and the time $t_i$,
 $T_2(\tau x_{vR})$ is a function that returns the distance traveled by the first video camera between the times $t_1$ and $t_i$ by integrating the speed $x_{vR}$ during the time $\tau$, and
 $w_5(\ldots)$ is a central projection that returns the coordinates in the plane of the reference image of the third point after it has been shifted by the distance $T_2(\tau x_{vR})$, this central projection being a function of intrinsic parameters of the second video camera notably including its focal length.

10. The method as claimed in claim 9, wherein the method includes calculating the time $\tau$:
 by identifying the row of pixels of the current image to which the first point belongs from the coordinates of that first point in the plane of the current image, and
 by multiplying the time $t_\Delta$ by n+1, where n is the number of rows that separate the row so identified from the first row captured in the current image.

11. The method as claimed in claim 8, wherein the value of the physical magnitude at the level of the point of the reference image, called the reference point, is constructed:
 by selecting points adjacent the reference point, each adjacent point corresponding to the projection onto the plane of the reference image of a third point the coordinates of which are obtained by shifting the second point a distance $T_2(-tx_{vR})$, where t is a time elapsed since the beginning of an exposure time $t_e$, that time being less than or equal to the exposure time $t_e$, and $T_2(\ldots)$ is a function that integrates the speed $x_{vR}$ during the time t, each adjacent point corresponding to a respective value of the time t and the time $t_e$ being equal to the exposure time of the first video camera, then
 by averaging the values of the physical magnitude at the level of the selected adjacent points and the reference point so as to generate a new value of the physical magnitude at the level of the reference point, that new value constituting an estimate of that which would be measured if the exposure time of the pixels of the second video camera were equal to $t_e$ and if the second video camera were to move at the speed $x_{vR}$ during the exposure time $t_e$, the values of the physical magnitude at the level of the adjacent points being obtained from the measurements stored in the reference image and the coordinates of the adjacent points.

12. The method as claimed in claim 8, wherein the speed $x_{vR}$ is a vector with six coordinates coding the speed of movement in translation and in rotation of the first video camera along three mutually orthogonal axes so that during the step e) the speed in translation and in rotation of the first video camera is estimated.

13. The method as claimed in claim 8, wherein during the step e) the coordinates of the pose $x_{pR}$ are considered as being unknowns to be estimated so that the steps d) and e) are then executed simultaneously by simultaneously seeking the pose $x_{pR}$ and the speed $x_{vR}$ that minimize the difference between the first and second values of the physical magnitude.

14. The method as claimed in claim 13, wherein while the simultaneously seeking the pose $x_{pR}$ and the speed $x_{vR}$, the coordinates of the pose $x_{pR}$ are defined by the relation $x_{pR}=t_p x_{vR}+x_{pR-1}$, where $x_{pR-1}$ is the estimate of the pose of the first video camera at the moment at which that first video camera captured the preceding current image and $t_p$ is the time that separates the moment of capture of the current image from the moment of capture of the preceding current image by the first video camera so that only six coordinates are to be estimated during the steps d) and e) to obtain simultaneously estimates of the speed $x_{vR}$ and the pose $x_{pR}$.

15. The method as claimed in claim 6, wherein the method comprises a construction of a trajectory of the first rolling shutter video camera in a three-dimensional scene, said construction including:
a) acquiring a three-dimensional model of the scene,
b) storing in an electronic memory a succession of temporally ordered images captured by the first video camera during its movement within the scene, each image including pixels organized in parallel rows, the rows of pixels being captured one after the other so that a non-zero time $t_\Delta$ elapses between the moments of capture of two successive rows of the current image, the memory containing for each pixel of the current image a measurement of a physical magnitude chosen in the group made up of the intensity of radiation emitted by the point photographed by that pixel and a depth separating that pixel from the photographed point of the scene,
c) for each current image:
  constructing or selecting from the three-dimensional model of the scene a reference image including pixels that have photographed the same points of the scene as the pixels of the current image,
  estimating said pose $x_{pR}$ of the first video camera at the moment at which the latter captures that current image,
  constructing the trajectory of the first video camera from the various estimated poses of the first video camera.

16. The method according to claim 13, wherein the method comprises a construction of a trajectory of the first rolling shutter video camera in a three-dimensional scene, said construction including:
a) acquiring a three-dimensional model of the scene,
b) storing in an electronic memory a succession of temporally ordered images captured by the first video camera during its movement within the scene, each image including pixels organized in parallel rows, the rows of pixels being captured one after the other so that a non-zero time $t_\Delta$ elapses between the moments of capture of two successive rows of the current image, the memory containing for each pixel of the current image a measurement of a physical magnitude chosen in the group made up of the intensity of radiation emitted by the point photographed by that pixel and a depth separating that pixel from the photographed point of the scene,
c) for each current image:
  constructing or selecting from the three-dimensional model of the scene a reference image including pixels that have photographed the same points of the scene as the pixels of the current image,
  estimating said pose $x_{pR}$ of the first video camera at the moment at which the latter captures that current image,
  constructing the trajectory of the first video camera from the various estimated poses of the first video camera.

17. The method according to claim 1, wherein the method comprises a processing of a current image of a three-dimensional scene, the current image including pixels organized in parallel rows, the rows of pixels having been captured one after the other so that a non-zero time $t_\Delta$ elapses between the moments of capture of two successive rows of the current image, said processing of a current image including:
a) estimating said speed $x_{vR}$ of movement of the first video camera at the moment at which that video camera captured the current image,
b) automatically modifying the current image to correct the current image on the basis of the estimated speed $x_{vR}$ and the time $t_\Delta$ so as to limit the distortions of the current image caused by the movement of the first video camera between the moments of capture of the various rows of pixels of the image.

18. The method according to claim 8, wherein the method comprises a processing of a current image of a three-dimensional scene, the current image including pixels organized in parallel rows, the rows of pixels having been captured one after the other so that a non-zero time $t_\Delta$ elapses between the moments of capture of two successive rows of the current image, said processing of a current image including:
a) estimating said speed $x_{vR}$ of movement of the first video camera at the moment at which that video camera captured the current image,
b) automatically modifying the current image to correct the current image on the basis of the estimated speed $x_{vR}$ and the time $t_\Delta$ so as to limit the distortions of the current image caused by the movement of the first video camera between the moments of capture of the various rows of pixels of the image, wherein the step of estimating the speed $x_{vR}$ is carried out using a method as claimed in claim 8.

19. An information storage medium, wherein it contains instructions for the execution of a method as claimed in claim 1 when those instructions are executed by an electronic computer.

20. A system for estimating the speed of movement of a first video camera at the moment at which that first video camera captures a current image of a three-dimensional scene, the current image including pixels organized in parallel rows, the rows of pixels having been captured one after the other so that a non-zero time $t_A$ elapses between the moments of capture of two successive rows of the current image, that system including:

an electronic memory containing:
a reference image corresponding to an image of the same scene captured by a second video camera in a different pose, the reference image including pixels organized in parallel rows, the memory containing for each pixel of the reference image the measurement of a physical magnitude measured by that pixel, that physical magnitude being chosen in the group made up of the intensity of radiation emitted by the point photographed by that pixel and a depth separating that pixel from the point of the scene photographed by that pixel,
the current image, the memory containing for each pixel of the current image the measurement of a physical magnitude measured by that pixel, that physical magnitude being the same as the physical magnitude measured by the pixels of the reference image,
for each pixel of the reference image or the current image, a measurement of a depth that separates that pixel from the point of the scene photographed by that pixel,
an information processing unit adapted to:
estimate the pose $x_{pR}$ of the first video camera,
estimate the speed $x_{vR}$ of movement of the first video camera during the capture of the current image, wherein the information processing unit is able to estimate the speed $x_{vR}$ by seeking the speed $x_{vR}$ that minimizes, for N points of the reference image, where N is an integer greater than 10% of the number of pixels of the reference image, a difference directly between:
a first value of the physical magnitude at the level of a first point of the reference image, that first value being constructed from at least one measurement of that physical magnitude stored in that reference image, and
a second value of the same physical magnitude at the level of a second point of the current image, that second value being constructed from measurements of that physical magnitude stored in the current image and the coordinates of the second point, the coordinates of the second point in the plane of the current image being obtained:
by determining the coordinates of a third point in the plane of the current image that corresponds to the projection onto that plane of the point of the scene photographed by the first point, those coordinates being determined from the estimated pose $x_{pR}$ and the measurements of the depths stored in the current image or the reference image, then
by shifting the third point a distance equal and opposite to the distance traveled by the first video camera between a time $t_1$ at which a first row of the current image is captured and a time $t_i$ at which the row of pixels to which the third point belongs was captured, that distance being a function of the time $t_A$ and the speed $x_{vR}$, and finally
by projecting the third point shifted in this way onto the plane of the current image to obtain the coordinates of the second point.

21. A system for estimating the speed of movement of a first video camera at the moment at which that first video camera captures a current image of a three-dimensional scene, the current image including pixels organized in parallel rows, the rows of pixels having been captured one after the other so that a non-zero time $t_A$ elapses between the moments of capture of two successive rows of the current image, that system including:

an electronic memory containing:
a reference image corresponding to an image of the same scene captured by a second video camera in a different pose, the reference image including pixels organized in parallel rows, the memory containing for each pixel of the reference image the measurement of a physical magnitude measured by that pixel, that physical magnitude being chosen in the group made up of the intensity of radiation emitted by the point photographed by that pixel and a depth separating that pixel from the point of the scene photographed by that pixel,
the current image, the memory containing for each pixel of the current image the measurement of a physical magnitude measured by that pixel, that physical magnitude being the same as the physical magnitude measured by the pixels of the reference image,
for each pixel of the reference image or the current image, a measurement of a depth that separates that pixel from the point of the scene photographed by that pixel,
an information processing unit adapted to:
estimate the pose $x_{pR}$ of the first video camera,
estimate the speed $x_{vR}$ of movement of the first video camera during the capture of the current image, wherein the information processing unit is able to estimate the speed $x_{vR}$ by seeking the speed $x_{vR}$ that minimizes, for N points of the current image, where N is an integer greater than 10% of the number of pixels of the current image, a difference directly between:
a first value of the physical magnitude at the level of a first point of the current image, that first value being constructed from at least one measurement of that physical magnitude stored in that current image, and
a second value of the same physical magnitude at the level of a second point of the reference image, that second value being constructed from measurements of that physical magnitude stored in the reference image and the coordinates of the second point in the plane of the reference image, the coordinates of the second point being obtained:
by determining the coordinates of a third point in the plane of the reference image that corresponds to the projection onto that plane of the point of the scene photographed by the first point, those coordinates being determined from the estimated pose $x_{pR}$ and the measurements of the depths stored in the current image or the reference image, then
by shifting the third point a distance equal to and in the same direction as the distance traveled by the first video camera between a time $t_1$ at which a first row of the current image is captured and a time $t_i$ at which the row of pixels to which the first point belongs was captured, that distance being a function of the time $t_A$ and the speed $x_{vR}$, and finally
by projecting the third point shifted in this way onto the plane of the reference image to obtain the coordinates of the second point.

\* \* \* \* \*